United States Patent
Troth et al.

(10) Patent No.: US 7,913,472 A0
(45) Date of Patent: Mar. 29, 2011

(54) HIP JACKGIRDER CONNECTION

(75) Inventors: Steve Troth, Castro Valley, CA (US);
Jin-Jie Lin, Livermore, CA (US);
Jacinta Pister, Lafayette, CA (US)

(73) Assignee: Simpson Strong-Tie Company, Inc.,
Pleasanton, CA (US)

( * ) Notice: Subject to any disclaimer, the term of this patent is extended or adjusted under 35 U.S.C. 154(b) by 0 days.

(21) Appl. No.: 10/279,177

(22) Filed: Oct. 23, 2002

(65) Prior Publication Data

US 2004/0079044 A1 Apr. 29, 2004

(51) Int. Cl.
*E04C 3/02* (2006.01)

(52) U.S. Cl. ............. 52/696; 52/293.2; 52/643; 52/702; 403/403; 403/232.1; 403/170

(58) Field of Classification Search .................... 52/712, 52/714, 715, 702, 696, 643, 293.2, 93.2, 52/295, 296, 298, 704, 707, 126.4, 393.2; 403/232.1, 230, 170, 171, 403, 231; 248/200, 248/300, 351, 346.5

See application file for complete search history.

(56) References Cited

U.S. PATENT DOCUMENTS

| | | | | |
|---|---|---|---|---|
| 414,169 | A | * | 10/1889 | Reuschel .................. 403/232.1 |
| 625,427 | A | | 5/1899 | Stewart |
| 828,488 | A | | 8/1906 | Lanz |
| 974,606 | A | | 11/1910 | Schrader |
| 1,343,647 | A | | 6/1920 | Smith |
| 1,568,072 | A | * | 1/1926 | Krueger et. al. ................. 33/3 B |
| 1,719,440 | A | * | 7/1929 | Nathan .............................. 5/130 |
| 1,785,791 | A | | 12/1930 | Ropp |
| 1,787,167 | A | | 12/1930 | Purdy |
| 1,925,804 | A | | 9/1933 | Hiering |
| 1,945,925 | A | * | 2/1934 | Stiefel ............................. 403/2 |
| 1,958,467 | A | | 5/1934 | Buckle |
| 2,006,925 | A | | 7/1935 | Klemp |
| 2,055,185 | A | | 9/1936 | Templeton |
| 2,086,225 | A | | 7/1937 | Hiering |
| 2,330,766 | A | * | 9/1943 | Walstrom ..................... 182/224 |

(Continued)

FOREIGN PATENT DOCUMENTS

EP 357273 * 3/1990 ...................... 52/712

(Continued)

OTHER PUBLICATIONS

"HJ Hip & Jack Truss Hanger" Product Data Sheet. Cleveland Steel Specialty Co. 1986.

(Continued)

*Primary Examiner* — Phi Dieu Tran A
(74) *Attorney, Agent, or Firm* — James R. Cypher; Charles R. Cypher (57) ABSTRACT

An improved connector formed with a seat member that is stiffened by first and second reinforcing flanges that extend around first and second corners at either end of a third edge of the seat member, the first and second reinforcing flanges being connected to the third edge and to first and second edges that intersect with the third edge, the fist and second edges also having side members connected to the seat member. When used as a hanger, the connector includes a seat member, first and second backwall members which are connected to the supporting girder and first and second side members connected to the supported trusses. A flange member integrally connected to the seat provides further connection when a jack truss is supported.

17 Claims, 10 Drawing Sheets

U.S. PATENT DOCUMENTS

| | | | |
|---|---|---|---|
| 2,638,643 A | | 5/1953 | Olson |
| 2,988,854 A | | 6/1961 | McKinley |
| 2,990,590 A | * | 7/1961 | Graveley ................ 403/189 |
| 3,036,347 A | | 5/1962 | Findleton |
| 3,041,033 A | * | 6/1962 | Schwartz ................ 248/248 |
| 3,055,103 A | | 9/1962 | Fernberg |
| 3,271,861 A | * | 9/1966 | Rosario ................ 33/3 B |
| 3,338,084 A | | 8/1967 | Stegman |
| 3,423,898 A | * | 1/1969 | Coloney et al. ........... 52/713 |
| 3,438,134 A | * | 4/1969 | Schunk ................ 33/515 |
| 3,457,647 A | * | 7/1969 | Cohen et al. ............ 33/3 R |
| 3,596,941 A | | 8/1971 | Tracy |
| 3,601,428 A | | 8/1971 | Gilb |
| 3,633,950 A | | 1/1972 | Gilb |
| 3,730,466 A | * | 5/1973 | Swanquist ........... 248/216.4 |
| 3,857,270 A | | 12/1974 | Iten |
| 3,879,144 A | | 4/1975 | Eckerbrecht |
| 3,972,169 A | | 8/1976 | Sheppard |
| 4,230,416 A | | 10/1980 | Gilb |
| 4,291,996 A | | 9/1981 | Gilb |
| 4,410,294 A | | 10/1983 | Gilb et al. |
| 4,414,785 A | | 11/1983 | Howell |
| 4,423,977 A | | 1/1984 | Gilb |
| 4,449,335 A | | 5/1984 | Fahey |
| 4,480,941 A | | 11/1984 | Gilb et al. |
| 4,498,801 A | * | 2/1985 | Gilb ................ 403/232.1 |
| 4,525,972 A | | 7/1985 | Palacio et al. |
| 4,572,695 A | | 2/1986 | Gilb |
| 4,598,521 A | | 7/1986 | Slapsys et al. |
| 4,711,593 A | | 12/1987 | Wilhelmi |
| 4,717,279 A | | 1/1988 | Commins |
| 4,802,786 A | | 2/1989 | Yauger |
| 4,817,359 A | | 4/1989 | Colonias |
| 4,890,436 A | | 1/1990 | Colonias |
| 4,897,979 A | | 2/1990 | Colonias |
| 4,920,725 A | | 5/1990 | Gore |
| 4,932,173 A | | 6/1990 | Commins |
| 4,964,253 A | | 10/1990 | Loeffler |
| 5,022,209 A | | 6/1991 | Kimura |
| 5,042,217 A | | 8/1991 | Bugbee et al. |
| 5,104,252 A | * | 4/1992 | Colonias et al. ......... 403/232.1 |
| 5,203,069 A | | 4/1993 | Hennig |
| 5,236,273 A | | 8/1993 | Gilb |
| 5,253,465 A | | 10/1993 | Gilb |
| 5,263,296 A | | 11/1993 | Spera |
| 5,274,981 A | * | 1/1994 | Commins ................ 52/712 |
| 5,341,619 A | | 8/1994 | Dunagan et al. |
| 5,364,312 A | * | 11/1994 | Cunard et al. ........... 472/118 |
| 5,367,853 A | * | 11/1994 | Bryan ................ 52/702 |
| 5,380,115 A | * | 1/1995 | Colonias ............... 403/170 |
| 5,380,116 A | | 1/1995 | Coloanias |
| D355,349 S | | 2/1995 | Taparauskas, Jr. |
| D363,862 S | * | 11/1995 | Lusignan ................ D8/10 |
| D364,331 S | | 11/1995 | Leek |
| 5,524,397 A | * | 6/1996 | Byers et al. ........... 52/92.2 |
| 5,598,680 A | | 2/1997 | Wilhelmi |
| 5,603,580 A | | 2/1997 | Leek et al. |
| 5,666,774 A | | 9/1997 | Commins |
| D392,144 S | * | 3/1998 | Vogler ................ D6/574 |
| 5,727,831 A | * | 3/1998 | Dritlein, Jr. ............ 294/59 |
| 5,806,265 A | | 9/1998 | Sluiter |
| 5,951,078 A | * | 9/1999 | Whitehead et al. ......... 294/54.5 |
| 5,987,828 A | | 11/1999 | Hardy |
| 6,230,466 B1 | | 5/2001 | Pryor |
| 6,254,306 B1 | | 7/2001 | Williams |
| 6,260,402 B1 | | 7/2001 | Leek |
| 6,338,511 B1 | * | 1/2002 | Douglas et al. ........... 294/49 |
| 6,446,409 B1 | | 9/2002 | Emerson |
| 6,523,321 B1 | | 2/2003 | Leek et al. |
| 6,625,945 B2 | | 9/2003 | Commins |
| 6,655,099 B1 | * | 12/2003 | Trenoweth ................ 52/243 |
| 6,662,517 B1 | * | 12/2003 | Thompson ................ 52/714 |
| 6,840,020 B2 | | 1/2005 | Leek et al. |
| 6,983,548 B1 | * | 1/2006 | Cook et al. ................ 33/515 |
| 2001/0002529 A1 | * | 6/2001 | Commins et al. ........... 52/481.1 |
| 2002/0002806 A1 | | 1/2002 | Commins et al. |
| 2002/0020137 A1 | | 2/2002 | Commins |
| 2004/0065032 A1 | | 4/2004 | Commins |
| 2004/0079044 A1 | | 4/2004 | Troth et al. |

FOREIGN PATENT DOCUMENTS

| | | | |
|---|---|---|---|
| EP | 1 413 686 A1 | | 4/2004 |
| GB | 185694 | | 9/1922 |
| GB | 422765 | | 1/1935 |
| GB | 1179267 | | 6/1967 |
| GB | 2 018 935 | | 10/1979 |
| GB | 2018935 | * | 10/1979 ................ 403/232.1 |
| GB | 2 070 184 A | | 9/1981 |
| GB | 2 228 955 | | 9/1990 |
| JP | 6-262267 | | 9/1994 |
| WO | WO/00/53352 | | 9/2000 |

OTHER PUBLICATIONS

"Structural Truss Connectors." Lumberlok: Structural Framing Connectors Catalog & Specifications. p. 37, Lumberlok. Hayward, Calif. 1988.

"THJA26 Truss Hip and Jack Hanger." Product Data Sheet. Simpson Strong-Tie Company, Inc. San Leandro, Calif. 1991.

"MTHM/MTHM-2 Multiple Truss Hangers." Simpson Strong-Tie Company Wood Construction Connectors Catalog C-2000, p. 92. Simpson Strong-Tie Company, Inc. Pleasanton, Calif. 1999.

"RTC Rigid Tie™ Connectors." Simpson Strong-Tie Company Wood Construction Connectors Catalog C-2000, p. 113. Simpson Strong-Tie Company, Inc., Pleasanton, Calif. 1999.

"SBV/CF Shelf Bracket—Concrete Form Angle" Simpson Strong-Tie Connectors for Wood Construction Product & Instruction Manual Catalog C95H-1, p. 65. Simpson Strong-Tie Company, Inc. Pleasanton, Calif. 1994.

RTA/RTB/RTF/RTT/RTU/FW2 Rigid Tie™ Connectors' Simpson Strong-Tie Connectors for Wood Construction Product & Instruction Manual Catalog C95H-1, p. 67. Simpson Strong-Tie Company, Inc. Pleasanton, Calif. 1994.

"Panelized Construction" *Handbook of Structural Designs & Load Values.* Simpson Strong-tie Timber Connectors, Catalog No. 79H-1 1979. Simpson Strong-Tie Co., Inc. Copyright 1978, p. 16.

"Formed Seat Joist Hangers." *Joist Hangers and Framing Connectors. Structural Designs & Load. Values.* Simpson Catalog No. 66H1. Simpson Strong-Tie Co., Inc. Copyright 1965, p. 3.

*Konstruieren mit Sichtholz-Verbindem und der größten Auswahl einbaufertiger Serienteile.* Bulldog-Simpson Bausysteme Für Holz catalog, Bulldog-Simpson GMBH catalog, Copyright 1999, p. 3.

"Glulam Saddle Hanger" *Strong-Tie Connectors*, Catalog No. 71H1. Simpson Strong-Tie Company, Inc. 1971, p. 13.

"EPB44T Elevated Post Bases" *Simpson Strong-Tie Connectors—Wood Constructions Connectors.* Catalog C02000. Simpson Strong-Tie Company, Inc., 2000, p. 34.

\* cited by examiner

HIP JACKGIRDER CONNECTION

BACKGROUND

This invention relates to a connector for joining structural members. In particular, the connector of the present invention has particular application as sheet metal hanger for joining multiple framing members.

In the particular application for joining multiple members, the framing members may be either standard dimension lumber or wood trusses and truss girders. Specifically, the connection is most typically made at the juncture of the supporting truss girder or framing header and one or two hip framing members or wood trusses or a hip truss or wood framing member and a jack framing member or jack truss.

Prior art U.S. Pat. No. 5,253,465, granted to Tyrell T. Gilb teaches a sheet metal connector for connecting multiple truss connections. U.S. Pat. No. 4,817,359, granted to Karen Colonias also teaches a similar connection with a sheet metal hanger; however, neither of the patents teach the improved connector of the present invention.

SUMMARY OF THE INVENTION

The improved connector of the present invention provides a connector with a seat member that is stronger and less likely to deflect under load conditions. The seat member is less likely to deflect because it is stiffened by first and second reinforcing flanges that extend around first and second corners at either end of a third edge of the seat member, the first and second reinforcing flanges being connected to the third edge and to first and second edges that intersect with the third edge, the fist and second edges also having side members connected to the seat member.

When the connector is formed from a sheet metal blank that is bent and formed into its final form, forming the first and second reinforcing flanges to extend around the first and second corners allows the first and second side members connected to the first and second edges to be formed with a simple bending operation, while allowing for the presence of an effective strengthening flange along third edge to strengthen the seat against deflection.

The improved connector of the present invention, when used as a multiple framing member or truss connector is capable of making three separate connections: viz.; (A). joining to a support girder, (1) a right hip truss and a jack truss, (2) a left hip truss and a jack truss, or (3) a right and left hip truss; or (B) joining to a support header, (1) a right hip framing member and a jack framing member, (2) a left hip framing member and a jack framing member, or (3) a right and left hip framing member.

Another advantage of the present invention when used as a multiple framing member hanger is that it may be installed after the wood framing members or trusses have been temporarily affixed to the support header or support girder.

Another advantage of the present invention when used as a multiple framing member hanger, hanger, post base or holdown is that the seat of the present invention better resists deflection.

DESCRIPTION OF THE PREFERRED EMBODIMENTS OF THE INVENTION

Figure 1:
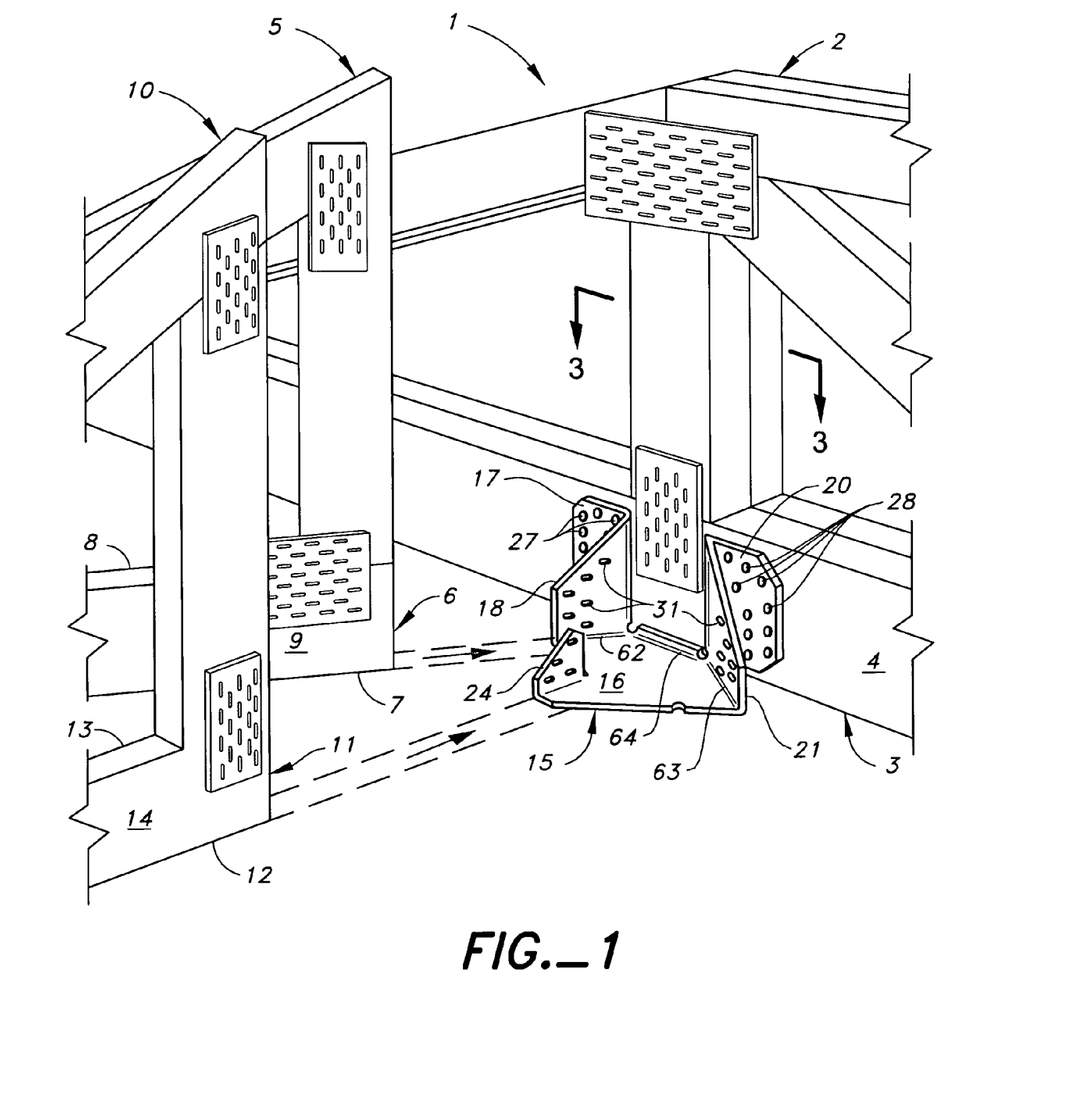
FIG. 1 is a perspective view of the present invention used as a multiple framing member hanger.
Figure 3:
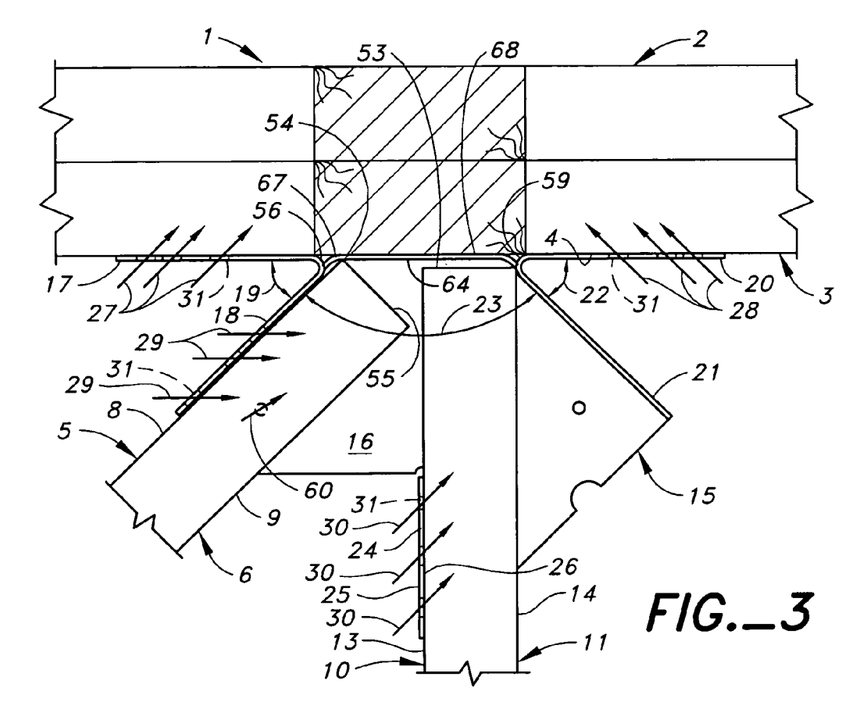
FIG. 3 is a top plan view of a portion of the multiple framing member connection taken generally along line 3—3 of FIG. 1 and illustrating a first hip truss and a first jack truss connected by a hanger formed according to the present invention.

FIGS. 1 and 3 show a multiple truss connection 1 including: a support girder 2 having a wood bottom chord 3 with a front face 4; a first hip truss 5 having a wood bottom chord 6 with a bottom edge 7 and parallel first and second sides 8 and 9; a first jack truss 10 having a wood bottom chord 11 having a bottom edge 12 and parallel first and second sides 13 and 14; and a a sheet metal hanger 15 formed according to the present invention.

Figure 2:
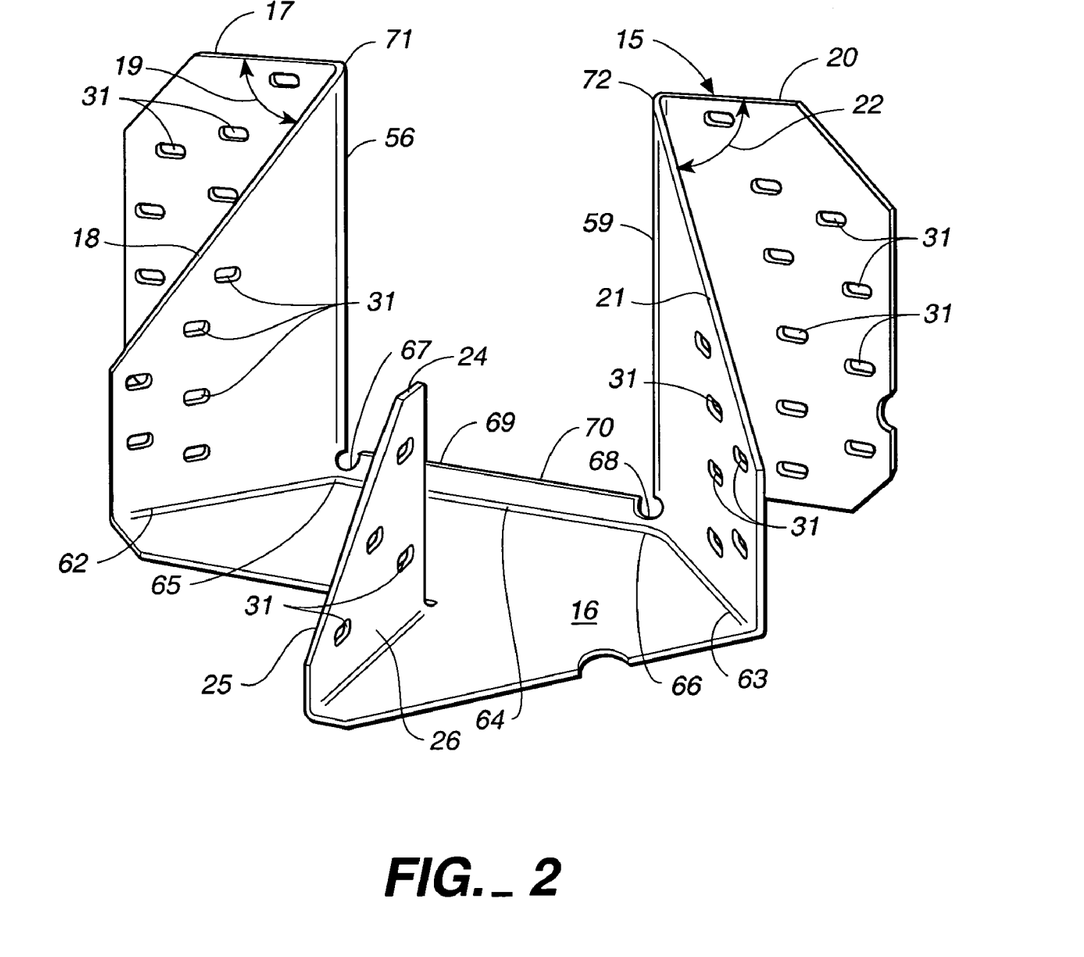
FIG. 2 is a perspective view of a multiple framing member hanger formed according to the present invention.
Figure 6:
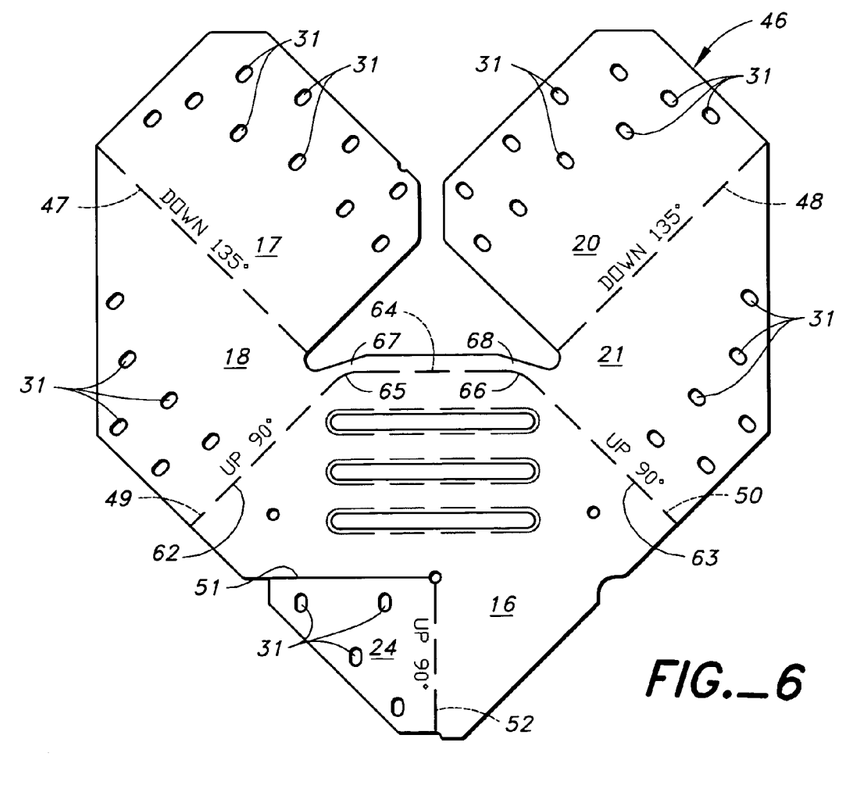
FIG. 6 is a top plan view of a sheet metal blank prior to bending from which a sheet metal hanger formed according to the present invention illustrated in FIG. 2 is constructed.
Figure 7:
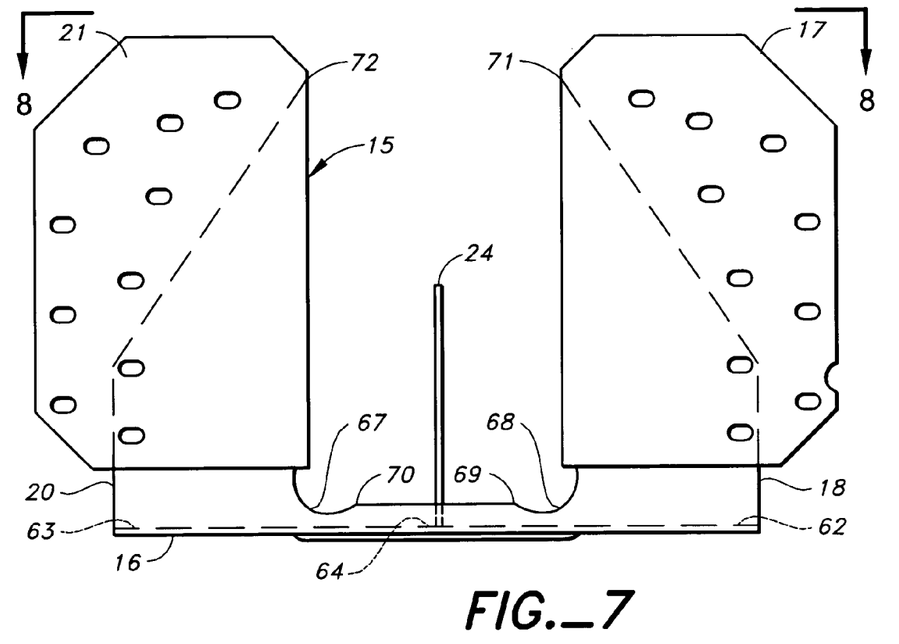
FIG. 7 is back view of hanger formed according to the present invention.
Figure 8:
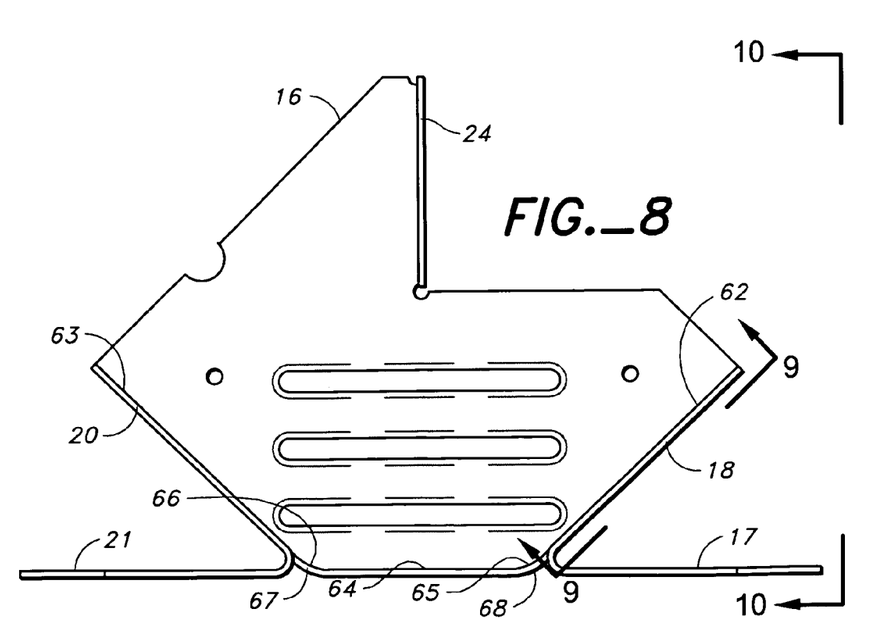
FIG. 8 is a top plan view of a hanger formed according to the present invention taken along line 8—8 of FIG. 7.
Figure 9:
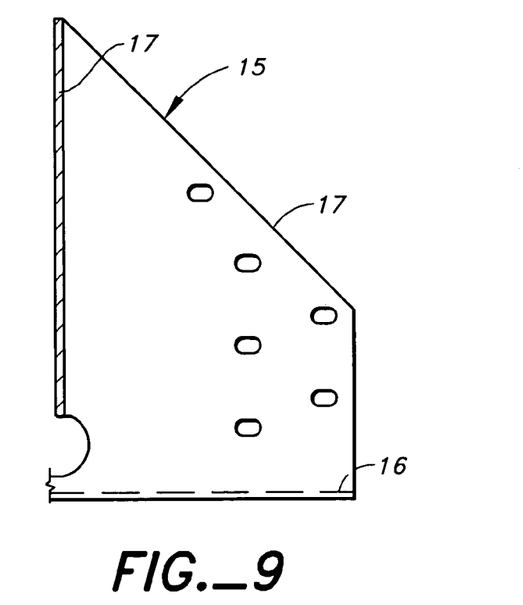
FIG. 9 is a sectional side view of the first side member of the hanger of the present invention taken along line 9—9 of FIG. 8.
Figure 10:
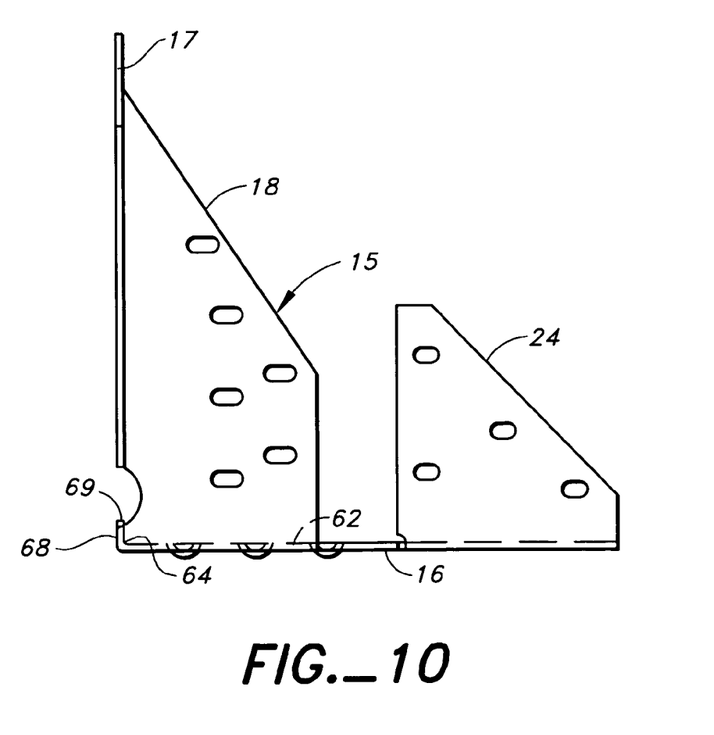
FIG. 10 is a side view of the hanger of the present invention taken along line 10—10 of FIG. 8.
Figure 12:
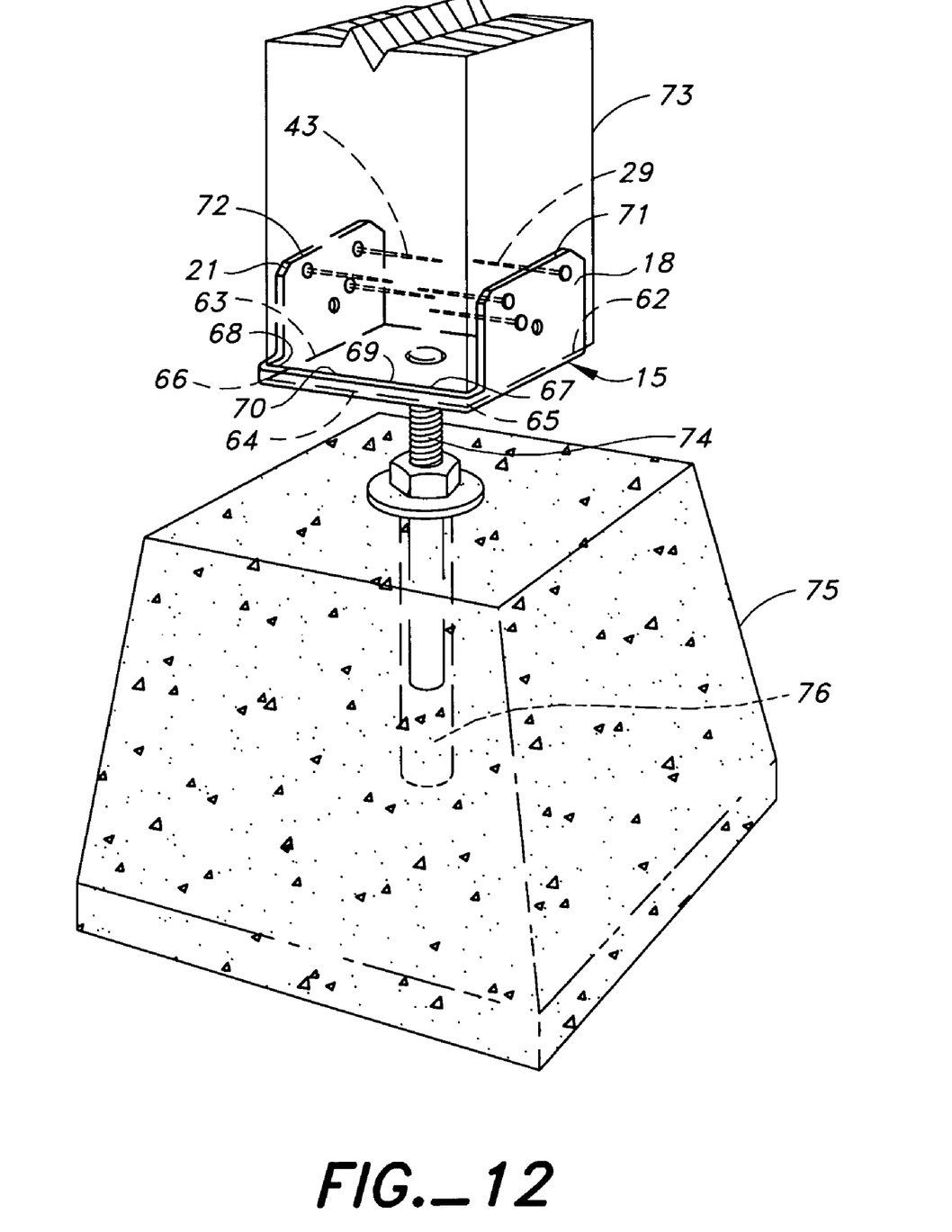
FIG. 12 is a perspective view of a connector formed according to the present invention used as a post base.

As shown in FIGS. 2, 7 and 12, a sheet metal connector 15, formed according to the present invention has a seat member 16. The seat member is formed with at least a first edge 62, a second edge 63, and a third edge 64. The first edge 62 of the seat member 16 intersects with the third edge 64 at a first corner 65, and the second edge 63 intersects with the third edge 64 at a second corner 66. The first and second corners 65 and 66 are distinct from each other. The first and second corners 65 and 66 are spaced away from each other a selected distance along the third edge 64. As described here, the seat member 16 is defined by at least three edges 62, 63 and 64, but as shown in FIGS. 1 through 6 and 8, the boundaries of the seat member are defined by many more edges. Although the edges 62, 63 and 64 shown in FIGS. 2 and 8 are shown as being substantially linear, the edges 62, 63 and 64, according to the present invention need not be straight, but could be arcs or curves, although, according to the present invention, the edges 62, 63 64 should not be segments of one arc on a circle described by a single radius.

In a connector 15 formed according to the present invention, first and second reinforcing flanges 67 and 68 are connected to the seat 16. The first reinforcing flange 67 is connected to a portion of the third edge 64 of the seat member 16 near the first corner 65, and the first reinforcing flange 67 extends around the first corner 65 to connect to a portion of the first edge 62. The second reinforcing flange 68 is connected to a portion of the third edge 64 of the seat member 16 near the second corner 66, and the second reinforcing flange 68 extends around the second corner 66 to connect to a portion of the second edge 63.

The first and second reinforcing flanges 67 and 68 extend upwardly from the seat member 16 to maximum selected heights 69 and 70, respectively.

As shown in FIGS. 1, 2, 6 and 7 the first and second reinforcing flanges 67 and 68 preferably extend along the third edge 64 towards each other and are joined to each other at a point along said third edge 64.

In a connector 15 formed according to the present invention, a first side member 18 is connected to a portion of the first edge 62 of the seat member 16. This first side member 18 extends upwardly from the seat member 16 to a maximum selected height 71 that is substantially greater than the maximum selected height 69 of the first reinforcing flange 67. The first side member 18 and the first reinforcing flange 67 are distinct members, although as shown in FIGS. 1 through 6 the first side member 18 is joined to the first reinforcing flange 67.

In a connector 15 formed according to the present invention, a second side member 21 is connected to a portion of the second edge 63 of the seat member 16. This second side member 21 extends upwardly from the seat member 16 to a maximum selected height 72 that is substantially greater than the maximum selected height 70 of the second reinforcing flange 68. The second side member 21 and the second reinforcing flange 68 are distinct members, although as shown in FIGS. 1 through 6 the second side member 21 is joined to the second reinforcing flange 68.

As best shown in FIGS. 1 and 2, the first and second side members 18 and 21 are connected to each other only through said seat member 16 and said first and second reinforcing flanges 67 and 68.

The preferred hanger 15 formed according to the present invention for making a multiple framing member connection also includes: a seat member 16, as previously mentioned, for receiving the bottom edges 7 and 12 of the first hip truss 5 and the first jack truss 10; a first backwall member 17 formed to register with the front face 4 of the support girder 2; a first side member 18 integrally connected to the first backwall member 17 at an acute angle 19 and integrally connected to the seat member 16, and disposed for registration with the first side 8 of the first hip truss 5; a second backwall member 20 spaced from the first backwall member 17 formed for registration with the front face 4 of the support girder 2; a second side member 21 integrally connected to the second backwall member 20 at an acute angle 22 and at a right angle 23 with the first side member 18 and integrally connected to the seat member 16; and a flange member 24 having first and second faces 25 and 26 integrally connected to the seat member 16 and extending upwardly therefrom and located for registration of the second face 26 with the first side 13 of the first jack truss 10.

First fasteners 27 insert through the first backwall member 17 into the support girder 2, second fasteners 28 insert through the second backwall member 20 into the support girder 2, third fasteners 29 insert through the first side member 18 into the first hip truss 5, fourth fasteners 30 insert through the flange member 24 into the first jack truss 10, and a seventh fastener 60 inserts through the seat 16 into the first hip truss 5 to complete the multiple truss connection 1.

For ease in making the installation, fastener opening means 31 are formed in the first backwall member 17, the first side member 18, the second backwall member 20, and the flange member 24 for permitting slant angle fastening.

Figure 4:
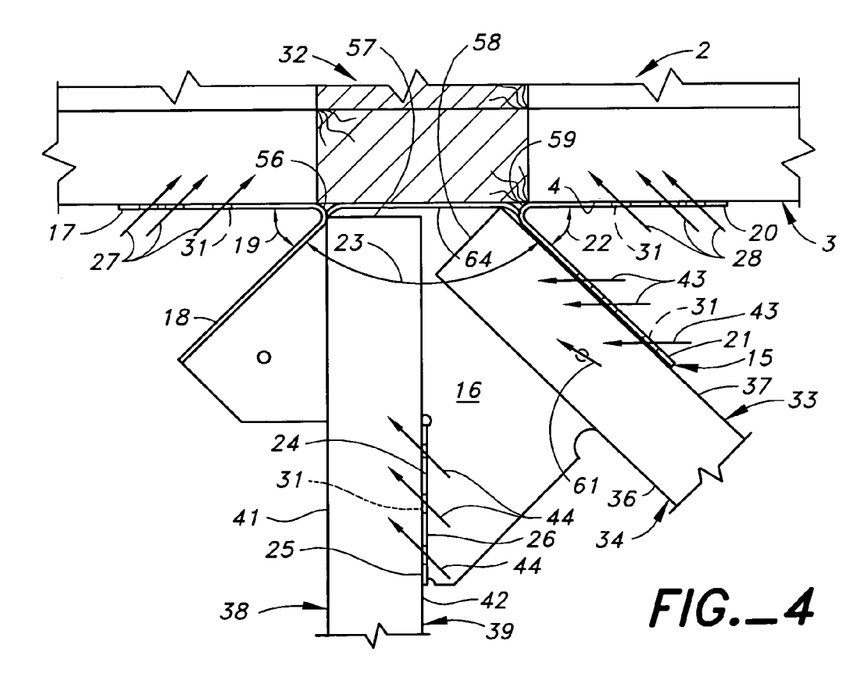
FIG. 4 is a top plan view of a portion of another multiple framing member connection using a hanger formed according to the present invention. The view is similar to that shown in FIG. 3 taken along line 3—3 of FIG. 1 except that a second hip truss and a second jack truss are illustrated.

Another multiple truss connection 32 is illustrated in FIG. 4, using the preferred hanger 15, formed according to the present invention, for making a multiple framing member connection This connection includes a support girder 2, having a wood bottom chord 3 having a front face 4, a second hip truss 33 including a wood bottom chord 34 having a bottom edge and parallel first and second sides 36 and 37; a second jack truss 38 including a wood bottom chord 39 having a bottom edge 40 and parallel first and second sides 41 and 42, and a sheet metal hanger 15.

The sheet metal hanger 15, shown in FIG. 4, is as described above and further includes a seat member 16, as previously mentioned, for receiving the bottom edges 35 and 40 of the second hip truss 33 and the second jack truss 38, a first backwall member 17 formed for registration with the front face 4 of the support girder 2, a first side member 18 integrally connected to the first backwall member 17 at an acute angle 19 and integrally connected to the seat member 16, a second backwall member spaced from the first backwall member 17 formed for registration with the front face 4 of the support girder 2, a second side member 21 integrally connected to the second backwall member 20 at an acute angle 22 and at a right angle 23 with the first side member 18 and integrally connected to the seat member 16 and disposed for registration with the second side 37 of the second hip truss 33, and a flange member 24 having first and second faces and 26 integrally connected to the seat member 16 and extending upwardly therefrom and located for registration of the first face 25 with the second side 42 of the second jack truss 38.

As shown in FIG. 4, first fasteners 27 insert through the first backwall member 17 into the support girder 2; second fasteners 28 insert through the second backwall member 20 into the support girder 2; sixth fasteners 43 insert through the second side member 21 into the second hip truss 33, fifth fasteners 44 insert through the flange member 24 into the second jack truss 38, and an eighth fastener 61 inserts through the seat 16 into the second hip truss 33 to complete the multiple truss connection 32. The connector 15 also includes fastener opening means 31 formed in the first backwall member 17, the second side member 21, the second backwall member 20, and the flange member 24 for permitting slant angle fastening.

Figure 5:
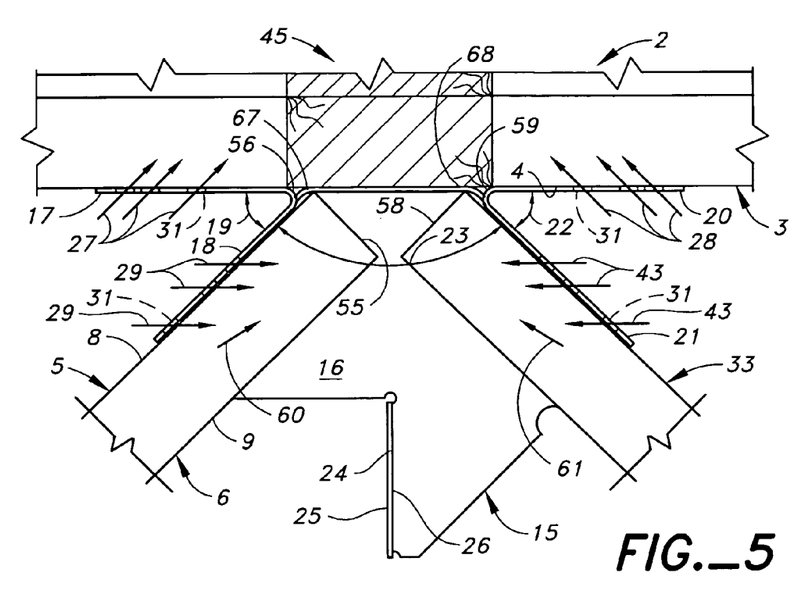
FIG. 5 is a top plan view of a portion of still another form of multiple framing member connection using a hanger formed according to the present invention. The view is similar to that show in FIG. 3 taken along line 3—3 of FIG. 1 except that a first hip truss and a second hip truss are illustrated.

Still another multiple truss connection 45 that uses the same hanger is illustrated in FIG. 5, showing: a support girder 2 including a wood bottom chord 3 having a front face 4, a first hip truss 5 including a wood bottom chord 6 having a bottom edge 7 and parallel first and second sides 8 and 9; a second hip truss 33 including a wood bottom chord 34 having a bottom edge 35 and parallel first and second sides 36 and 37, and a sheet metal hanger 15 formed according to the present invention.

The sheet metal hanger 15, formed according to the present invention, also includes: a seat member 16 that is formed for receiving the bottom edges 7 and 35 of the of the first hip truss 5 and second hip truss 33, a first backwall member 17 formed for registration with the front face 4 of the support girder 2, a first side member 18 integrally connected to the first backwall member 17 at an acute angle 19 and integrally connected to the seat member 16, and disposed for registration with the first side 8 of the first hip truss 5, a second backwall member 20 spaced from the first backwall member 17 also formed for registration with the front face 4 of the support girder 2, and a second side member 21 integrally connected to the second backwall member 20 at an acute angle 22 and at a right angle 23 with the first side member 18 and integrally connected to the seat member 16, and disposed for registration with the second side 37 of the second hip truss 33.

First fasteners 27 insert through the first backwall member 17 into the support girder 2; second fasteners 28 insert through the second backwall member 20 into the support girder 2; third fasteners 29 insert through the first side member 18 into the first hip truss 5; and sixth fasteners 43 insert through the second side member 21 into the second hip truss 33, a seventh fastener 60 inserts through the seat 16 into the first hip truss 5, and an eighth fastener 61 inserts through the seat 16 into the second hip truss 33 to complete the multiple truss connection 45. The hanger 15 also includes fastener opening means 31 formed in the first backwall member, the first side member, the second backwall member, and the second side member for permitting slant angle fastening.

The hanger of the present invention is not limited to making multiple truss connections, but may also be used in a multiple framing member connection. The description of the following multiple framing member connection is identical to the multiple truss connection described earlier except that simple framing members are described. The framing members could be made out of any common building material for structural framing members such as wood or steel. If wood framing members are used they could be standard wood framing members such as 2×6's, 2×8's or other standard size lumber that may be used instead of wood trusses. No change has been made in the numbering system and no separate drawings of standard lumber have been made as the drawings in plan view would look identical. The following description is provided for preferred wood framing members.

A multiple framing member connection 1 made with a hanger formed according to the present invention includes: a support header member 2 having a front face 4, a first wood framing member 5 having a bottom edge 6 and parallel first and second sides 8 and 9, a second wood framing member 10 having a bottom edge 12 and parallel first and second sides 13 and 14, and a sheet metal hanger 15 formed according to the present invention.

The sheet metal hanger 15 of the present invention also includes: a seat member 16 for receiving the bottom edges 7 and 12 of the first wood framing member 5 and the second wood framing member 10, a first backwall member 17 formed for registration with the front face 4 of the support header member 2, a first side member 18 integrally connected to the first backwall member 17 at an acute angle 19 and integrally connected to the seat member 16, a second backwall member 20 spaced from the first backwall member 17 and formed for registration with the front face 4 of the support header member 2, a second side member 21 integrally connected to the second backwall member 20 at an acute angle 22 and at a right angle 23 with the first side member 18 and integrally connected to the seat member 16, and a flange member 24 having first and second faces 25 and 26 integrally connected to the seat member 16 and extending upwardly therefrom and disposed at a right angle to the first and second backwall members 17 and 20.

First fasteners 27 are inserted through the first backwall member 17 into the support header member 2, second fasteners 28 are inserted through the second backwall member 20 into the support header member 2, third fasteners 29 are inserted through the sheet metal hanger 15 into the first wood framing member 5, fourth fasteners 30 are inserted through the sheet metal hanger 15 into the second wood framing member 10, and a seventh fastener 60 is inserted through the seat 16 into the first wood framing member 5 to complete the multiple wood framing member connection 1.

Figure 11:
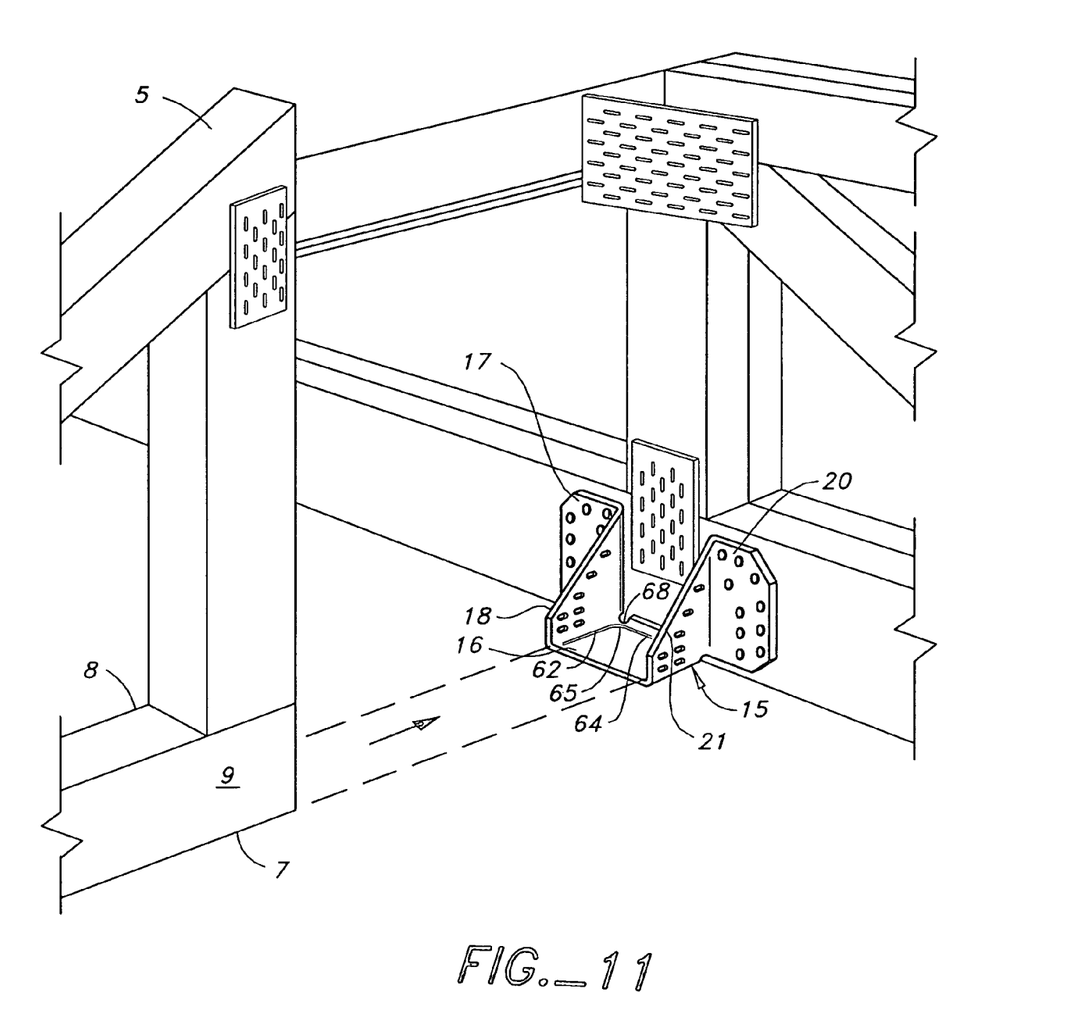
FIG. 11 is a perspective view of connector formed according to the present invention used as a joist hanger.

As shown in FIG. 11, a hanger 15 formed according to the present invention can be used as a joist hanger to carry only one truss member or structural member 5. In the application shown in FIG. 11, the first and second side members 18 and 21 are bent at a right angles from the first and second back members 17 and 20. Preferably, the first and second side members also register with the sides 8 and 9 of the truss 5, and the seat 16 supports the bottom edge 7 of the truss 5.

As shown in FIG. 12, a connector 15 formed according to the present invention can also be used as a post base. The connector is formed with a seat 16 and side members 18 and 21 bent upwardly from the seat. As shown in FIG. 12, the first and second side members are bent upwardly from the first and second edges 62 and 63. As is also shown, the third edge 64 of the seat member 16 intersects with the first and second edges 62 and 63 at first and second corners 65 and 66. The first and second reinforcing flanges 67 and 68 are connected to each other, and to portions of the first and third edges 62 and 64, and the second and third edges 63 and 64, respectively. Third and sixth fasteners 29 and 43 are inserted through the first and second side members 18 and 21 and into the post or vertically disposed structural member 73 supported by the seat 16. For light loads these fasteners 29 and 43 can be nails. For greater loads these fasteners 29 and 43 can be heavy self-drilling screws. A bolt 74 is connected to the seat member and anchored in a concrete foundation 75, typically by acrylic based or epoxy adhesives or concrete grout 76.

Figure 13:
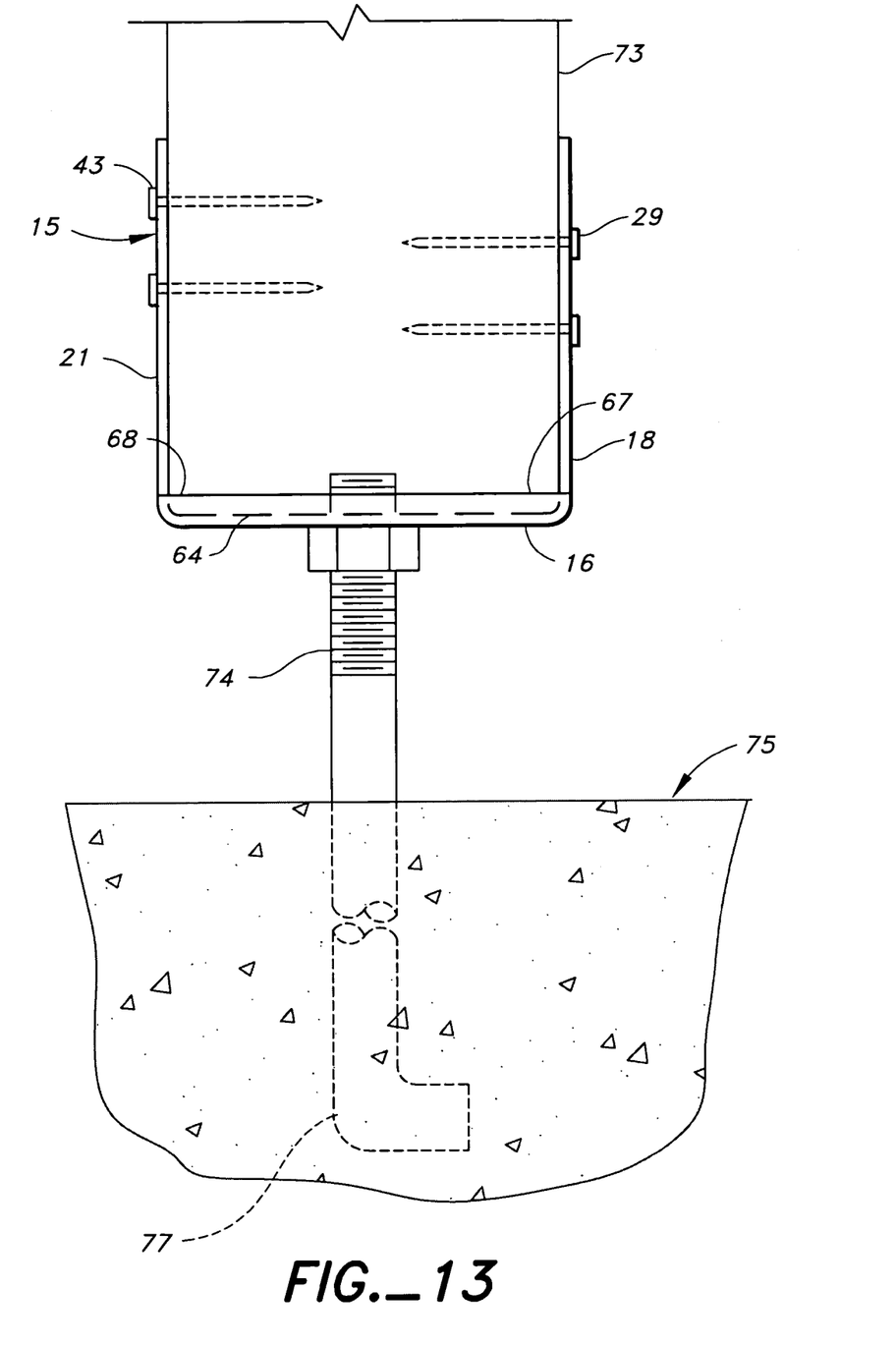
FIG. 13 is a side view of a connector formed according to the present invention used as a post base.

FIG. 13 is a side view of a connector formed according to the present invention used as a post base, and is similar to FIG. 12. In the application shown in FIG. 13, the bolt 74 is not permanently connected to the seat member 16 as shown in FIG. 12. The bolt 74 is threaded into the connector 15, and is received in a bore in the post 73. The bolt 74 is embedded in the concrete foundation 75, having been set during the concrete pour. The bolt 74 is formed with a curve 77 to create a mechanical interlock with the foundation 75.

Figure 14:
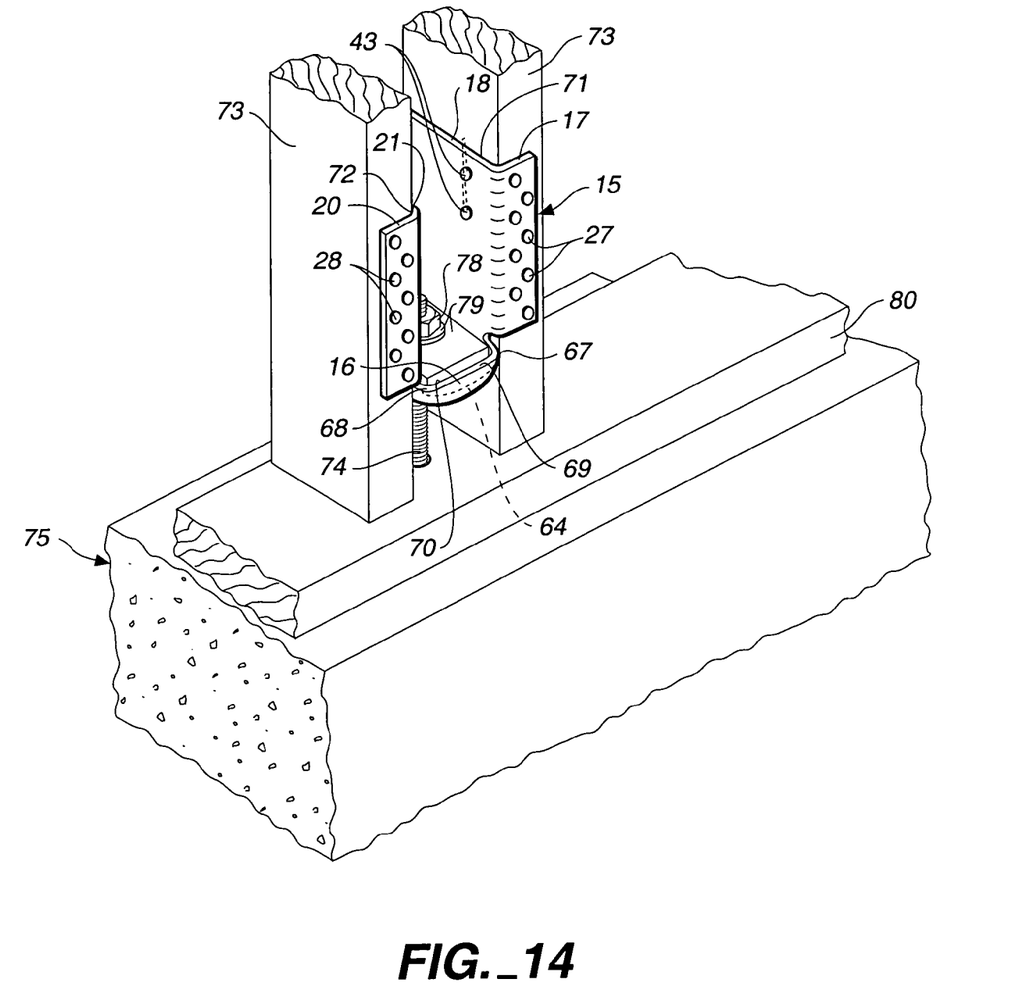
FIG. 14 is a perspective view of a connector formed according to the present invention used as a holdown.

FIG. 14 is a perspective view of a connector 15 formed according to the present invention used as a holdown. As shown in FIG. 13 the connector 15 is attached to a bolt 74 embedded in the foundation 75. The bolt 74 is connected to the connector 15 by means of a nut 78 and a series of washers 79. The connection shown is used to resist tension forces transmitted from the posts 73 attached to the connector 15 by means of first and second fasteners 27 and 28 through the first and second backwall members 17 and 20. The bottom washer 79 is formed with a curved base to conform to the curved seat 16 of the connector 15. The posts 73 rest on a mudsill 80 that rests on the foundation 75. Additional fasteners 43 could be used to attach the first side wall 18 to the post 73.

When formed for use in a multiple truss connection, a preferred embodiment of a sheet metal hanger 15 formed according to the present invention may be constructed from a sheet metal blank 46 using 18 gauge material.

A typical blank 46 is illustrated in FIG. 6. A progressive die machine may be used to cut and bend the blank 46 as follows: first, the blank 46 is cut from a sheet metal coil as illustrated in FIG. 6. Backwall member 17 is bent downwardly 135° along bend line 47, second back member 20 is bent downwardly 135° along bend line 48, first side member 18 is bent up 90° along bend line 49, and second side member 21 is bent up 90° along bend line 50. A cut 51 is made in seat member 16 and flange member 24 is bent up 90° along bend line 52. The joined first and second reinforcing flanges are formed by bending the blank along the third edge and portions of the first and second edges in the last station of the progressive die machine at the same time that the flange member 24, and the first and second side members 18 and 21 are bent upwardly 90 degrees from the seat member 16 in a process that combines draw and wiping processes.

Fastener openings 31 as illustrated in the drawings are obround openings and the structure and function of the openings is fully described in Gilb, U.S. Pat. No. 4,230,416, which is incorporated herein by reference. Another way of constructing the openings 31 to permit slant fastening is described in Gilb, U.S. Pat. No. 4,480,941, which is also incorporated herein by reference.

In one preferred embodiment, for use as a multiple framing member, hanger, the connector 15 of the present invention is preferably made of 18 gauge sheet metal and finished by galvanizing. In its final configuration, such a preferred sheet metal hanger 15 can be 9" in width, 5 9/16" in depth, and 5 7/16" in height. The first and second reinforcing flanges 67 and 68 are joined and are 1/4" at their highest point in this preferred embodiment.

With further reference to the blank 46, shown in FIG. 6, the minimum width of the seat 16 between first side member 18 and second side member 21 is 3 1/8" and the maximum width is 7 3/8". The first and second side members 18 and 21 have a maximum height of 4 12/16" and a maximum width of 3 1/16". The first and second backwall members 17 and 20 have a width of 2 15/16" and a height of 4.7". To add rigidity to the seat member 16, three bosses are formed in the metal that are 3"×1/4" and are one thickness in depth, with the concave surface facing upwardly.

A preferred embodiment of the connector 15, formed according to the present invention, and used as a mutliple truss connector has been tested to determine allowable loads. The connector 15 was used to connect a first hip truss 5 and a first jack truss 10 to a support girder as shown in FIGS. 1 and 3. Southern Pine lumber or an equivalent was used to make the trusses, and the hanger was made from 18 gauge, galvanized sheet steel. A total of twenty (20) ten-penny (10d) nails were driven through the back members 17 and 20 into the support girder 2. Six (6) ten-penny (10d), 1 1/2" long, nails were driven into the side face 8 of the first hip truss 5. One (1) ten-penny (10d), 1 1/2" long, nail was installed into the bottom edge 7 of the first hip truss 5. Four (4) ten-penny (10d), 1 1/2" long, nails were driven into the side face 13 of the first jack truss 10. The allowable uplift load for the hip truss 5 was determined to be 220 lbs and for the jack truss 10 to be 75 lbs. The hip truss 5 has an allowable snow load of 875 lbs, allowable roof and floor loads of 875 lbs, and an allowable wind load of 875 lbs. The jack truss 10 has allowable snow, floor, roof and wind loads of 290 lbs.

Referring to FIGS. 1 and 3, formation of multiple truss connection 1 with a connector 15 formed according to the present invention is as follows. Many contractors prefer to butt end 53 of first jack truss 10 up against front face 4 of support girder 2 and tack nail it. Next first hip truss 5 is placed at a 45 degree angle with first jack truss 10 so that a corner 54 is up against face 4 of support girder 2 and tacked to support girder 2. Next, hanger 15 is shoved up underneath the hip and jack truss until the bottom edges 7 and 12 are in registration with seat 16 of sheet metal connector 15. First and second fasteners such as nails 27 and 28 are then driven through obround openings 31 in first and second backwall members 17 and 20 into wood bottom chord 3 of support girder 2. Because of restriction caused by first hip truss 5, first fasteners are driven at an angle to the front face 4 of the wood bottom chord 3 of the support girder 2 which is roughly parallel to the wood bottom chord 6. Second fasteners 28 are driven in like manner through fastener openings 31 in second backwall member 20 into wood bottom chord 3 of support girder 2. Third fasteners 29 are then driven through fastener openings 31 in first side member 18, at an angle to the axis of wood bottom chord 6 of first hip truss 5. The nails are driven generally parallel to the front face 4 of wood bottom chord 3 of support girder 2. Fourth fasteners 30 are driven at an angle through fastener openings 31 in flange member 24 into wood bottom chord 11 of first jack truss 10. A seventh fastener 60 is driven up through the seat member 16 into the first hip truss 5.

The greatest number of nails are driven through first side member 18 into first hip truss 5 which carries the greater load. In addition, end 55 of first hip truss 5 is wedged between first jack truss 10 and the intersection 56 of first backwall member 17 and first side member 18. First jack truss is wedged between first hip truss 5 and intersection 59 of second backwall member 20 and second side member 21 of sheet metal connector 15.

It is to be understood that sheet metal connector 15 could be connected to support girder 2 and then the trusses placed on seat 16 and nailed.

Referring to FIG. 4, installation of the multiple truss connection 32 is as follows. As previously described the hip and jack truss could be first tacked to the support girder 2 and then the sheet metal hanger 15 could be shoved up from beneath. In the alternate installation, first fasteners 27 are driven through fastener openings 31 in first backwall member 17 into wood bottom chord 3 of support girder 2 at an angle. Next second fasteners 28 are driven through fastener openings 31 in second backwall member 20 and into wood bottom chord 3 of support girder 2 at an angle. Wood bottom chord 39 of second jack truss 38 is then placed on seat 16 of sheet metal hanger 15 with end 57 butted against front face 4 of wood bottom chord 3 of support girder 2. Next wood bottom chord 34 of second hip truss 33 is placed on seat member 15 of sheet metal hanger 15 and shoved back until the edges of end 58 of second hip truss 33 are butted up against second side 42 of second jack truss 38 and front face 4 of support girder 2.

Sixth fasteners 43 are then driven at an angle through obround openings 31 in second side member 21 into wood bottom chord 34 of second hip truss 33. Fifth fasteners 44 are driven through fastener openings 31 in flange member 24 and into wood bottom chord 39 of second jack truss 38. Finally, an eighth fastener 61 is driven through a fastener opening in seat 16 into the bottom chord 34 of secon hip truss 33. In addition to the holding power of the fasteners set forth above, end 57 of second jack truss 38 is held securely between intersection 56 of first backwall member 17 and first side member 18 and the end 58 of second hip truss 33. Second hip truss 33 is held by sixth fasteners 43 and seventh fastener means 61 and wedged between second jack truss 38 and the intersection 59 of second backwall member 20 and second side member 21.

Referring to FIG. 5, first and second hip trusses 5 and 33 may be tack nailed to support girder 2 and the sheet metal hanger 15 shoved up from beneath or the sheet metal hanger may first be installed and then the first and second hip trusses 5 and 33 placed thereon.

The first and second hip trusses 5 and 33 are installed exactly as set forth above and the installation procedure is not repeated. As may be seen from FIG. 5, the ends 55 and 58 of the first and second hip trusses 5 and 33 are wedged between intersections 56 and 59 of the sheet metal connector 15.

We claim:

1. A connector for joining structural members comprising:
   a. a unitary and substantially planar seat member having a first edge, a second edge, and a third edge,
      1. said first edge intersecting with said third edge at a first corner, and 2. said second edge intersecting with said third edge at a second corner, said second corner being spaced away from said first corner along said third edge;
b. a first reinforcing flange directly connected to and along a substantial portion of said third edge of said seat member near said first corner,
   1. said first reinforcing flange extending around said first corner to directly connect to and along a substantial portion of said first edge reinforcing the first edge and the first corner,
   2. said first reinforcing flange extending upwardly from said seat member to a maximum selected height;
c. a second reinforcing flange directly connected to and along a substantial portion of said third edge of said seat member near said second corner,
   1. said second reinforcing flange extending around said second corner to directly connect to and along a substantial portion of said second edge reinforcing the second edge and the second corner,
   2. said second reinforcing flange extending upwardly from said seat member to a maximum selected height;
d. a first side member directly connected to only a portion of said first edge of said seat member,
   said first side member extending upwardly from said seat member to a maximum selected height substantially greater than the maximum selected height of said first reinforcing flange; and
e. a second side member directly connected to only a portion of said second edge of said seat member near said second corner,
   said second side member extending upwardly from said seat member to a maximum selected height substantially greater than the maximum selected height of said second reinforcing flange; and wherein:
f. said second side member and said first side member are connected to each other only through said seat member and said first and second reinforcing flanges, and said first and second side members are provided with openings for receiving fasteners.

2. The connector for joining structural members of claim 1, wherein:
said first, second and third edges are substantially linear boundaries of said seat member.

3. The connector for joining structural members of claim 1, wherein:
said first, second and third edges are separate arcs.

4. The connector for joining structural members of claim 1, wherein:
said first and second reinforcing flanges extend along said third edge towards each other and are connected to said third edge along said third edge and are directly joined to each other at a point on and along said third edge.

5. The connector for joining structural members of claim 1, wherein:
said connector for joining structural members is made from sheet metal.

6. The connector for joining structural members of claim 1, wherein:
said first side member is connected to said first reinforcing member.

7. The connector for joining structural members of claim 1, wherein:
said second side member is connected to said second reinforcing member.

8. The connector for joining structural members of claim 6, wherein:
said second side member is connected to said second reinforcing member.

9. The connector for joining structural members of claim 8, wherein:
said first and second reinforcing flanges extend along said third edge towards each other and are connected to said third edge along said third edge and are directly joined to each other at a point on and along said third edge.

10. The connector for joining structural members of claim 9, wherein:
said connector for joining structural members is made from sheet metal.

11. A system having the connector of claim 1 further comprising:
a. a support girder having a front face;
b. a first truss having a bottom edge and parallel first and second sides;
c. the connector is a hanger, and said seat member receives said bottom edge of said first truss, and said hanger is also formed with
   1. a first backwall member which is in registration with said front face of said support girder, and said first side member is connected to said first backwall member at an angle and is connected to said seat member along a portion of said first edge of said seat member,
   2. a second backwall member spaced from said first backwall member, said second backwall member also being in registration with said front face of said support girder, and said second side member is connected to said second backwall member at an angle and is connected to said seat member along a portion of said second edge of said seat member;
d. fasteners inserted through said first backwall member into said support girder;
e. fasteners inserted through said second backwall member into said support girder; and
f. fasteners inserted through said sheet metal hanger into said first truss.

12. The system of claim 11, further comprising:
a. a second truss having a bottom edge and parallel first and second sides; and wherein
b. said seat member receives said bottom edges of said first and second trusses; and further comprising
c. fasteners inserted through said sheet metal hanger into said second truss.

13. The system of claim 12, wherein said hanger is also formed with:
a flange member having first and second faces connected to said seat member and extending upwardly therefrom and disposed at a right angle to said first and second backwall members.

14. A system having the connector of claim 1 further comprising:
a. a foundation;
b. a pair of posts; and wherein
c. the connector is also formed with
   1. a first backwall member which is in registration with one of said posts, and said first side member is connected to said first backwall member at an angle and is connected to said seat member along a portion of said first edge of said seat member,
   2. a second backwall member spaced from said first backwall member, said second backwall member also being in registration with one of said posts, and said second side member is connected to said second backwall member at an angle and is connected to said seat member along a portion of said second edge of said seat member;
d. fasteners inserted through said first backwall member into said post;
e. fasteners inserted through said second backwall member into said post; and
f. a bolt connected to said seat and connected to said foundation.

15. A system having the connector of claim 1 further comprising:
a. a foundation;
b. a post; and wherein
c. said connector is also formed with a first backwall member which is in registration with said post, and said first side member is connected to said first backwall member at an angle and is connected to said seat member along a portion of said first edge of said seat member;
d. fasteners inserted through said first backwall member into said post; and
e. a bolt connected to said seat and connected to said foundation.

16. A system having the connector of claim 1 further comprising:
a. a foundation;
b. a post; and wherein
c. said connector further comprising
1. fasteners inserted through said first side member into said post;
2. a bolt connected to said seat and connected to said foundation.

17. The system of claim 16, further comprising:
fasteners inserted through said second side member into said post.

* * * * *